(12) United States Patent
Nogami (10) Patent No.: US 6,885,511 B2
(45) Date of Patent: Apr. 26, 2005

(54) OBJECT LENS UNIT

(75) Inventor: Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/830,219

(22) Filed: Apr. 23, 2004

(65) Prior Publication Data

US 2004/0212903 A1 Oct. 28, 2004

(30) Foreign Application Priority Data

Apr. 24, 2003 (JP) .................................. P2003-119503

(51) Int. Cl.[7] .............................................. G02B 7/02
(52) U.S. Cl. ................................................ 359/819
(58) Field of Search ................................ 359/819, 811

(56) References Cited

U.S. PATENT DOCUMENTS

| | | | | |
|---|---|---|---|---|
| 4,725,126 A | * | 2/1988 | Siga et al. .................. | 359/819 |
| 4,778,253 A | * | 10/1988 | Siga et al. .................. | 359/819 |
| 6,097,536 A | * | 8/2000 | Bauer et al. ................ | 359/350 |
| 2003/0007260 A1 | * | 1/2003 | Saitoh et al. ............... | 359/819 |
| 2003/0179469 A1 | * | 9/2003 | Maeda et al. ............... | 359/719 |
| 2004/0021951 A1 | * | 2/2004 | Maeda et al. ............... | 359/643 |

FOREIGN PATENT DOCUMENTS

JP      11-1108000      4/1999

* cited by examiner

Primary Examiner—Ricky Mack
(74) Attorney, Agent, or Firm—Morgan, Lewis & Bockius LLP (57) ABSTRACT

Four filling recesses 14 are formed on an inner peripheral surface of a fitting groove 5, which is formed concentrically with a light passage hole in a holder 3, at intervals of 90 degrees in a circumferential direction. A bottom surface 14a of each filling recess 14 is inclined from one end face 3a of the holder 3 toward a lens receiving seat 6, such that a longitudinal sectional shape of each filling recess 14 is formed in a substantially triangular shape.

4 Claims, 6 Drawing Sheets

OBJECT LENS UNIT

BACKGROUND OF THE INVENTION

1. Field of the Invention

The present invention relates to an objective lens unit for use in an optical pickup, and more particularly to an objective lens unit that makes it possible to reliably fix an objective lens with a small amount of an adhesive.

2. Description of the Related Art

Figure 5:
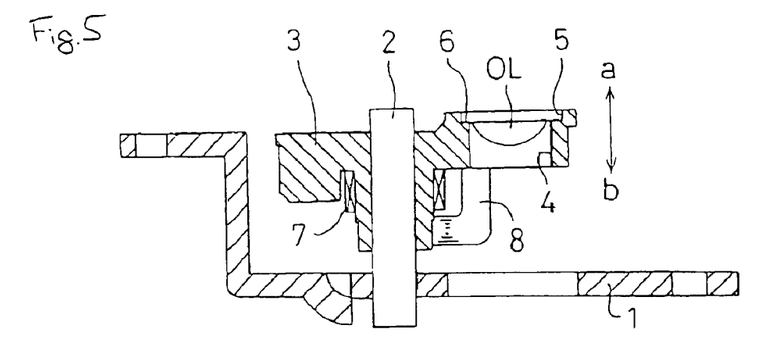
FIG. 5 is a longitudinal sectional view of the objective lens unit.
Figure 6:
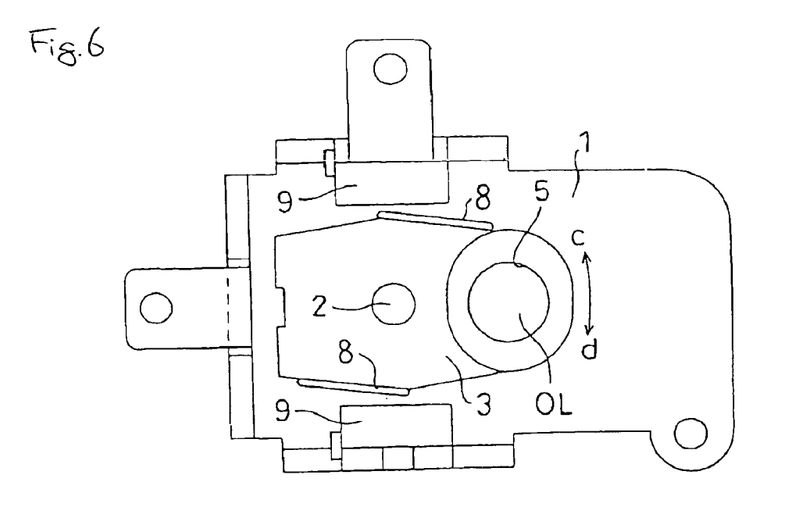
FIG. 6 is a plan view of the objective lens unit.

As an example of an objective lens, one shown in FIGS. 5 and 6 is conventionally known. This objective lens unit is arranged such that a light passage hole 4 is penetratingly provided in a distal end portion of a holder 3 which is slidable in focusing directions a and b along a shaft 2 on an actuating base 1 and is swingable about the shaft 2 in tracking directions c and d. Further, a fitting groove 5 whose diameter is greater than that of the light passage hole 4 is concentrically formed at one end portion of the light passage hole 4, thereby forming a lens receiving seat 6 on an inner peripheral surface of the light passage hole 4. An objective lens OL fitted in the light passage hole 4 is mounted on the lens receiving seat 6 and is fixed in the holder 3. It should be noted that reference numeral 7 denotes a focusing coil, 8 denotes a tracking coil, and 9 denotes a magnet.

In the above-described configuration, as the focusing coil 7 is energized and is hence excited, the holder 3 is slid in the focusing direction a or b along the shaft 2 to adjust the focus of the objective lens OL. As the tracking coil 8 is energized and is hence excited, the holder 3 is swung about the shaft 2 in the tracking direction c or d, thereby causing the objective lens OL to follow a predetermined track of a disk.

Figure 7:
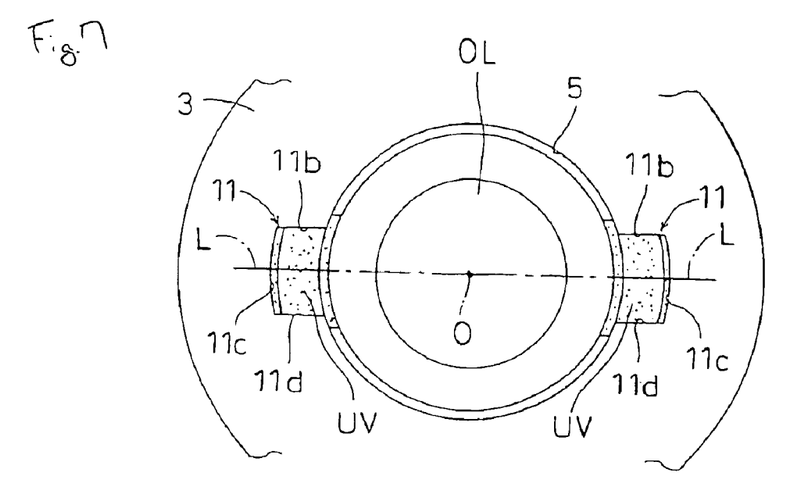
FIG. 7 is a plan view of essential portions illustrating a conventional example.
Figure 8:
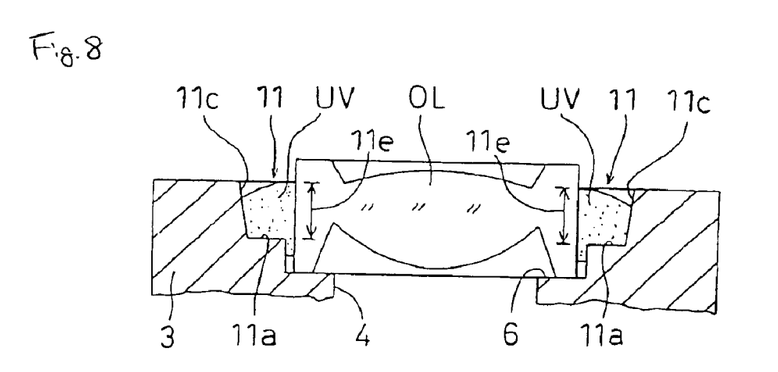
FIG. 8 is a longitudinal sectional view of the conventional example.
Figure 9A:
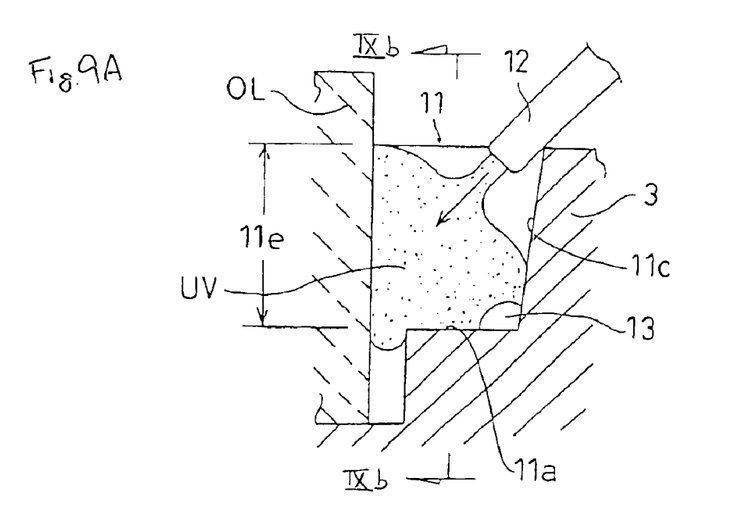
FIG. 9A is an enlarged longitudinal sectional view of a filling recess of the conventional example.
Figure 9B:
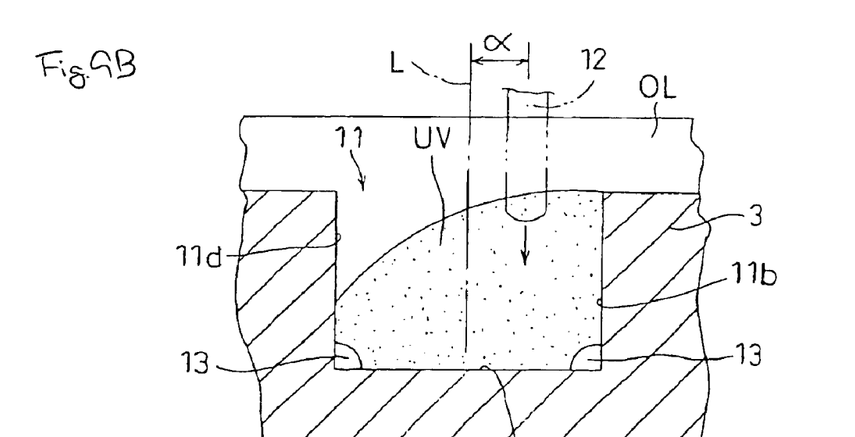
FIG. 9B is a view taken in the direction of arrows along line IXb—IXb.

As one example of a technique for fixing the objective lens OL to the holder 3, one disclosed in patent document 1 is known. In this technique, as shown in FIGS. 7 and 8, two rectangular filling recesses 11, in each of which a bottom surface 11a is set in a substantially horizontal state and inner side surfaces are set in a substantially vertical state, are formed on an inner peripheral surface of the fitting groove 5 at an opposing angle of 180 degrees. The objective lens OL fitted in the light passage hole 4 is mounted on the lens receiving seat 6, and an ultraviolet curing adhesive UV is filled into each filling recess 11 through a nozzle 12 of an adhesive applicator, as shown in FIGS. 9A and 9B. By allowing the adhesive UV to cure on application of ultraviolet rays thereto, the objective lens OL is fixed to the holder 3.

The above described structure is disclosed in JP-A-11-110800.

SUMMARY OF THE INVENTION

With the above-described conventional configuration, the filling recess 11 is constituted by a rectangular box-shaped space, the volume is relative large for the area of an opening lie opposing the objective lens OL. Therefore, if the adhesive UV is sufficiently filled in the filling recess 11, there is a possibility that strains and aberrations can occur in the objective lens OL due to the cure shrinkage of the filled adhesive UV.

In addition, since the bottom surface 11a of the filling recess 11 is formed in a substantially horizontal state, the function of allowing the adhesive UV filled along the bottom surface 11a to actively flow to the objective lens OL side is not provided. Therefore, there is also a possibility that the contact between the filled adhesive UV and the objective lens OL becomes unreliable.

Furthermore, since there are angular corner portions between the bottom surface 11a and each of the inner side surfaces 11b to 11d, when the adhesive UV is filled, there are cases where the air in the filling recess 11 cannot fully escape and accumulate in the corner portions, forming air traps 13. The adhesiveness based on the adhesive UV declines due to these air traps 13, and the air traps 13 undergo expansion and shrinkage due to a temperature change, possibly resulting in strains and aberrations in the objective lens OL.

Moreover, since a means for positioning the nozzle 12 applied to the filling recess 11 is not provided, there are cases where the nozzle 12 is laterally offset from a center line L extending from the center 0 of the light passage hole 4 and passing through the center of the filling recess 11. Since the adhesive UV is filled from the nozzle 12 in a state of being offset by that offset interval a, the contact area between the filled adhesive UV and the objective lens OL becomes small, possibly resulting in faulty bonding.

In view of the above-described conventional drawbacks, an object of the invention is to provide an object lens unit which makes it possible to reliably fix the objective lens with a small amount of the adhesive.

In order to attain the above object, according to a first aspect of the invention, there is provided an objective lens unit including: a holder that is provided on a shaft on an actuating base to be slidable along the shaft in a focusing direction and to be swingable about the shaft in a tracking direction; a light passage hole penetratingly provided in a distal end portion of the holder; a lens receiving seat formed on an inner peripheral surface of the light passage hole with a fitting groove whose diameter than that of the light passage hole, the fitting groove concentrically formed at one end portion of the light passage hole; a plurality of filling recesses formed on an inner peripheral surface of the fitting groove at intervals of a predetermined angle in a circumferential direction; an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat, wherein both inner side surfaces opposing each other with the bottom surface of each of the filling recesses placed therebetween are formed in a circular arc shape so as a transverse sectional shape of each of the filling recesses is formed substantially in a U-lettered shape with a narrow bottom, and wherein a plan view shape of each of the filling recesses is formed substantially in a U-lettered shape whose innermost side is narrowed so that an innermost-end circular arc portion of each of the filling recesses is formed on a center line extending from a center of the light passage hole and passing through a center of each of the filling recesses.

According to a second aspect of the invention, there is provided an objective lens unit including: a holder that is provided on a shaft on an actuating base to be slidable along the shaft in a focusing direction and to be swingable about the shaft in a tracking direction; a light passage hole penetratingly provided in a distal end portion of the holder; a lens receiving seat formed on an inner peripheral surface of the light passage hole with a fitting groove whose diameter than that of the light passage hole, the fitting groove concentrically formed at one end portion of the light passage hole; a plurality of filling recesses formed on an inner peripheral surface of the fitting groove at intervals of a predetermined angle in a circumferential direction; an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat.

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Referring to the drawings, an embodiment of the present invention will be explained below.

Figure 1:
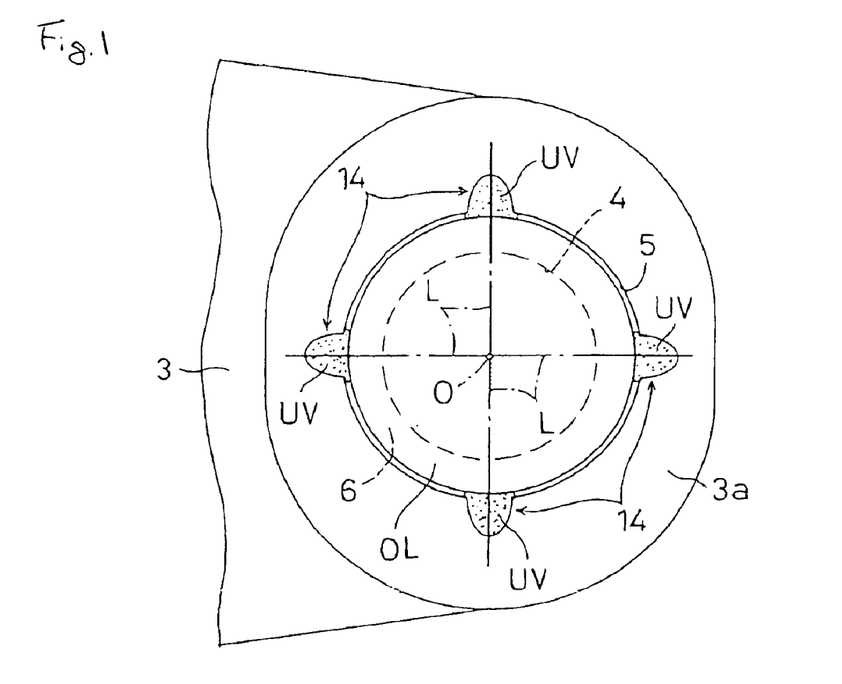
FIG. 1 is a plan view of essential portions of an objective lens unit in accordance with an embodiment of the invention.
Figure 2:
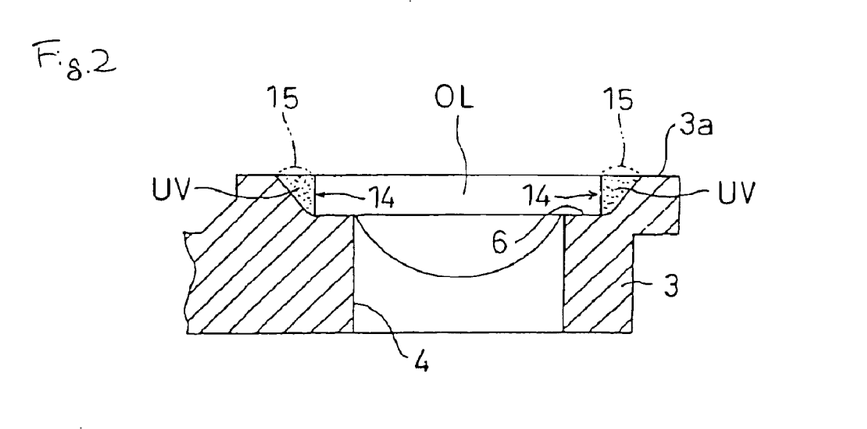
FIG. 2 is a longitudinal sectional view of the essential portions.
Figure 3:
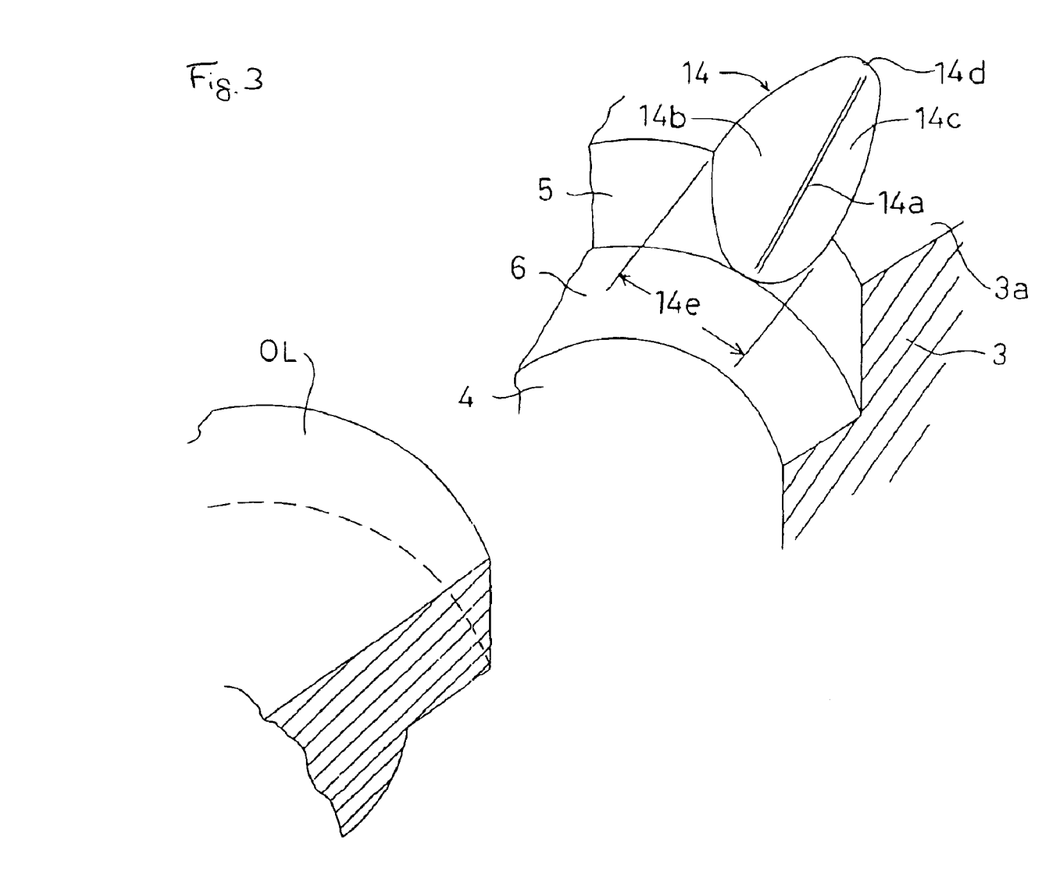
FIG. 3 is an exploded perspective view of the essential portions.
Figure 4A:
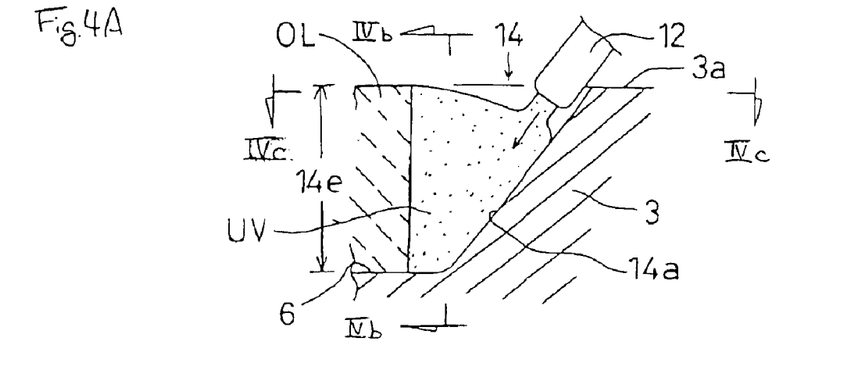
FIG. 4A is an enlarged longitudinal sectional view of a filling recess.
Figure 4B:
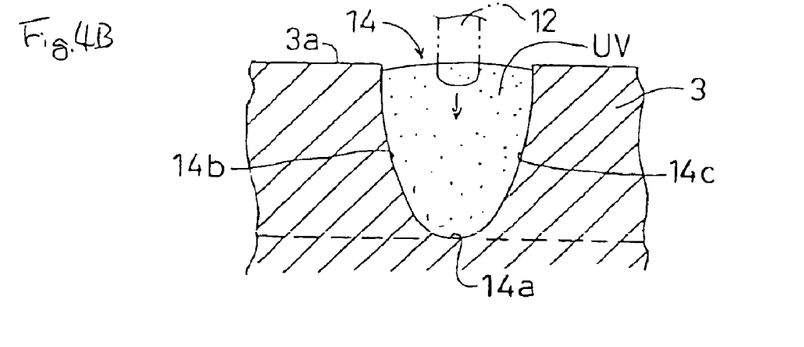
FIG. 4B is a view taken in the direction of arrows along line IVb—IVb in FIG. 4A.
Figure 4C:
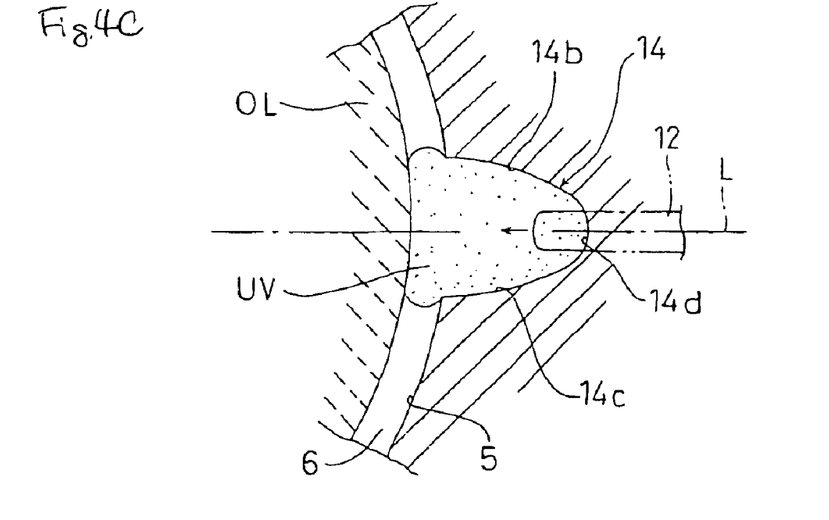
FIG. 4C is a view taken in the direction of arrows along line IVc—IVc in FIG. 4A.

FIGS. 1 through 3 show an objective lens unit as an embodiment of the invention. In the objective lens unit, four filling recesses 14 are formed on an inner peripheral surface of a fitting groove 5 at intervals of 90 degrees in the circumferential direction. As shown in FIG. 4A, a bottom surface 14a of each filling recess 14 is inclined from one end face 3a of a holder 3 toward a lens receiving seat 6, such that a longitudinal sectional shape of each filling recess 14 is formed in a substantially triangular shape. As shown in FIG. 4B, both inner side surfaces 14b and 14c opposing each other with the bottom surface 14a of each filling recess 14 placed therebetween are formed in a circular arc shape, such that a transverse sectional shape of each filling recess 14 is formed substantially in a U-lettered shape with a narrow bottom. As shown in FIG. 4C, the plan view shape of each filling recess 14 is formed substantially in a U-lettered shape whose innermost side is narrowed. Consequently, an innermost-end circular arc portion 14d of each filling recess 14 is formed on the center line L extending from the center 0 of a light passage hole 4 and passing through the center of each filling recess 14 (see FIG. 1). Since the other arrangements are substantially similar to those shown in FIGS. 5 through 8, identical portions will be denoted by the same reference numerals, and a description thereof will be omitted.

A description will be given of the procedure of fixing an objective lens OL. After the objective lens OL fitted in the light passage hole 4 is mounted on the lens receiving seat 6, a nozzle 12 of an adhesive applicator is applied to the innermost-end circular arc portion 14d. Then, an ultraviolet curing adhesive UV is filled into each filling recess 14 through the nozzle 12. By allowing the adhesive UV to cure on application of ultraviolet rays thereto, the objective lens OL is fixed to the holder 3.

According to the above-described configuration, as shown in FIG. 4A, the longitudinal sectional view of each filling recess 14 is formed in a substantially triangular shape, and its volume is relatively small for the area of an opening 14e opposing the objective lens OL. Therefore, the amount of the adhesive UV filled with respect to the filling recess 14 can be small, and the fixation of the objective lens OL can be effected reliably by that small amount of the adhesive UV. At the same time, it is possible to minimize the adverse effect of the strains and aberrations of the objective lens OL due to the cure shrinkage of the adhesive UV.

In addition, the bottom surface 14a of each filling recess 14 is inclined from one end face 3a of the holder 3 toward the lens receiving seat 6, and the adhesive UV filled along that inclined bottom surface 14a is caused to actively flow toward the objective lens OL side. Therefore, the filled adhesive UV and the objective lens OL can be actively brought into contact with each other, thereby making it possible to firmly fix the objective lens OL.

Furthermore, as shown in FIG. 4B, the transverse sectional shape of each filling recess 14 is formed substantially in a U-lettered shape with a narrow bottom by the circular arc-shaped inner side surfaces 14b and 14c of each filling recess 14. Therefore, when the adhesive UV is filled, the air in each filling recess 14 is smoothly allowed to escape along the circular arc-shaped inner side surfaces 14b and 14c, and an air trap 13 (see FIG. 9) is prevented from being formed in each filling recess 14 in the conventional manner. Accordingly, it is possible to overcome the drawbacks such as a decline in the adhesiveness of the adhesive UV due to the air trap 13 as well as the occurrence of strains and aberrations in the objective lens OL due to the expansion and shrinkage of the air trap 13 caused by a temperature change.

Moreover, as shown in FIG. 4C, the innermost-end circular arc portion 14d of each filling recess 14 is formed on the center line L passing through the center of each filling recess 14 (see FIG. 1). Therefore, by merely applying the nozzle 12 of the adhesive applicator to that innermost-end circular arc portion 14d, the nozzle 12 can be positioned so as to be directed toward the center of each filling recess 14 and not to unexpectedly move. By filling the adhesive UV from that nozzle 12 into each filling recess 14 without being offset, the contact area between the filled adhesive UV and the objective lens OL can be made large, thereby making it possible to prevent the occurrence of faulty bonding.

In the above-described embodiment the arrangement provided is such that an upper surface of the adhesive UV filled in the filling recess 14 becomes substantially flush with an upper surface of the objective lens OL. However, as shown by the phantom line in FIG. 2, a lens protector 15 may be formed by building up the upper surface of the adhesive UV in a convex shape higher than the upper surface of the objective lens OL. In this case, the objective lens OL can be protected by the lens protector 15 so as not to be damaged by colliding against a disk (not shown).

As described above, according to a first aspect of the invention, there is provided an objective lens unit including: a holder that is provided on a shaft on an actuating base to be slidable along the shaft in a focusing direction and to be swingable about the shaft in a tracking direction; a light passage hole penetratingly provided in a distal end portion of the holder; a lens receiving seat formed on an inner peripheral surface of the light passage hole with a fitting groove whose diameter than that of the light passage hole, the fitting groove concentrically formed at one end portion of the light passage hole; a plurality of filling recesses formed on an inner peripheral surface of the fitting groove at intervals of a predetermined angle in a circumferential direction; an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat, wherein both inner side surfaces opposing each other with the bottom surface of each of the filling recesses placed therebetween are formed in a circular arc shape so as a transverse sectional shape of each of the filling recesses is formed substantially in a U-lettered shape with a narrow bottom, and wherein a plan view shape of each of the filling recesses is formed substantially in a U-lettered shape whose innermost side is narrowed so that an innermost-end circular arc portion of each of the filling recesses is formed on a center line extending from a center of the light passage hole and passing through a center of each of the filling recesses.

In accordance with the first aspect of the invention, as shown in one embodiment (see FIGS. 1 through 4), the longitudinal sectional view of each filling recess is formed in a substantially triangular shape, and its volume is relatively small for the area of an opening opposing the objective lens. Therefore, the amount of the adhesive filled with respect to the filling recess can be small, and the fixation of the objective lens can be effected reliably by that small amount of the adhesive. At the same time, it is possible to minimize the adverse effect of the strains and aberrations of the objective lens due to the cure shrinkage of the adhesive.

In addition, the bottom surface of each filling recess is inclined from one end face of the holder toward the lens receiving seat, and the adhesive filled along that inclined bottom surface is caused to actively flow toward the objective lens side. Therefore, the filled adhesive and the objective lens can be actively brought into contact with each other, thereby making it possible to firmly fix the objective lens.

Furthermore, the transverse sectional shape of each filling recess is formed substantially in a U-lettered shape with a narrow bottom by the circular arc-shaped inner side surfaces of each filling recess. Therefore, when the adhesive is filled, air in each filling recess is smoothly allowed to escape along the circular arc-shaped inner side surfaces, and an air trap is prevented from being formed in each filling recess in the conventional manner. Accordingly, it is possible to overcome the drawbacks such as a decline in the adhesiveness of the adhesive due to the air trap as well as the occurrence of strains and aberrations in the objective lens due to the expansion and shrinkage of the air trap caused by a temperature change.

Moreover, the innermost-end circular arc portion of each filling recess is formed on the center line passing through the center of each filling recess. Therefore, by merely applying the nozzle of the adhesive applicator to that innermost-end circular arc portion, the nozzle can be positioned so as to be directed toward the center of each filling recess and not to unexpectedly move. By filling the adhesive from that nozzle into each filling recess without being offset, the contact area between the filled adhesive and the objective lens can be made large, thereby making it possible to prevent the occurrence of faulty bonding.

According to a second aspect of the invention, there is provided an objective lens unit including: a holder that is provided on a shaft on an actuating base to be slidable along the shaft in a focusing direction and to be swingable about the shaft in a tracking direction; a light passage hole penetratingly provided in a distal end portion of the holder; a lens receiving seat formed on an inner peripheral surface of the light passage hole with a fitting groove whose diameter than that of the light passage hole, the fitting groove concentrically formed at one end portion of the light passage hole; a plurality of filling recesses formed on an inner peripheral surface of the fitting groove at intervals of a predetermined angle in a circumferential direction; an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat.

In accordance with the second aspect of the invention, the longitudinal sectional view of each filling recess is formed in a substantially triangular shape, and its volume is relatively small for the area of an opening opposing the objective lens. Therefore, the amount of the adhesive filled with respect to the filling recess can be small, and the fixation of the objective lens can be effected reliably by that small amount of the adhesive. At the same time, it is possible to minimize the adverse effect of the strains and aberrations of the objective lens due to the cure shrinkage of the adhesive.

In addition, the bottom surface of each filling recess is inclined from one end face of the holder toward the lens receiving seat, and the adhesive filled along that inclined bottom surface is caused to actively flow toward the objective lens side. Therefore, the filled adhesive and the objective lens can be actively brought into contact with each other, thereby making it possible to firmly fix the objective lens.

According to a third aspect of the invention, in addition to the second aspect, both inner side surfaces opposing each other with the bottom surface of each of the filling recesses placed therebetween are formed in a circular arc shape so as a transverse sectional shape of each of the filling recesses is formed substantially in a U-lettered shape with a narrow bottom.

In accordance with the third aspect of the invention, the transverse sectional shape of each filling recess is formed substantially in a U-lettered shape with a narrow bottom by the circular arc-shaped inner side surfaces of each filling recess. Therefore, when the adhesive is filled, air in each filling recess is smoothly allowed to escape along the circular arc-shaped inner side surfaces, and an air trap is prevented from being formed in each filling recess in the conventional manner. Accordingly, it is possible to overcome the drawbacks such as a decline in the adhesiveness of the adhesive due to the air trap as well as the occurrence of strains and aberrations in the objective lens due to the expansion and shrinkage of the air trap caused by a temperature change.

According to a fourth aspect of the invention, in addition to the second aspect, a plan view shape of each of the filling recesses is formed substantially in a U-lettered shape whose innermost side is narrowed so that an innermost-end circular arc portion of each of the filling recesses is formed on a center line extending from a center of the light passage hole and passing through a center of each of the filling recesses.

In accordance with the fourth aspect of the invention, the innermost-end circular arc portion of each filling recess is formed on the center line passing through the center of each filling recess. Therefore, by merely applying the nozzle of the adhesive applicator to that innermost-end circular arc portion, the nozzle can be positioned so as to be directed toward the center of each filling recess and not to unexpectedly move. By filling the adhesive from that nozzle into each filling recess without being offset, the contact area between the filled adhesive and the objective lens can be made large, thereby making it possible to prevent the occurrence of faulty bonding.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An objective lens unit comprising:

a holder that is provided on a shaft on an actuating base to be slidable along the shaft in a focusing direction and to be swingable about the shaft in a tracking direction;

a light passage hole penetratingly provided in a distal end portion of the holder;

a lens receiving seat formed on an inner peripheral surface of the light passage hole with a fitting groove whose diameter than that of the light passage hole, the fitting groove concentrically formed at one end portion of the light passage hole;

a plurality of filling recesses formed on an inner peripheral surface of the fitting groove at intervals of a predetermined angle in a circumferential direction;

an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat, wherein both inner side surfaces opposing each other with the bottom surface of each of the filling recesses placed therebetween are formed in a circular arc shape so as a transverse sectional shape of each of the filling recesses is formed substantially in a U-lettered shape with a narrow bottom, and wherein a plan view shape of each of the filling recesses is formed substantially in a U-lettered shape whose innermost side is narrowed so that an innermost-end circular arc portion of each of the filling recesses is formed on a center line extending from a center of the light passage hole and passing through a center of each of the filling recesses.

2. An objective lens unit comprising:

a holder that is provided on a shaft on an actuating base to be slidable along the shaft in a focusing direction and to be swingable about the shaft in a tracking direction;

a light passage hole penetratingly provided in a distal end portion of the holder;

a lens receiving seat formed on an inner peripheral surface of the light passage hole with a fitting groove whose diameter than that of the light passage hole, the fitting groove concentrically formed at one end portion of the light passage hole;

a plurality of filling recesses formed on an inner peripheral surface of the fitting groove at intervals of a predetermined angle in a circumferential direction;

an objective lens fitted in the light passage hole and mounted on the lens receiving seat; and an ultraviolet curing adhesive filled into each of the filling recess and cured by application of ultraviolet rays thereto to fix the objective lens to the holder, wherein a longitudinal sectional shape of each of the filling recesses is formed to be substantially triangular shape by inclining a bottom surface of each of the filling recesses from one end face of the holder toward the lens receiving seat.

3. The objective lens unit according to claim 2, wherein both inner side surfaces opposing each other with the bottom surface of each of the filling recesses placed therebetween are formed in a circular arc shape so as a transverse sectional shape of each of the filling recesses is formed substantially in a U-lettered shape with a narrow bottom.

4. The objective lens unit according to claim 2, wherein a plan view shape of each of the filling recesses is formed substantially in a U-lettered shape whose innermost side is narrowed so that an innermost-end circular arc portion of each of the filling recesses is formed on a center line extending from a center of the light passage hole and passing through a center of each of the filling recesses.

* * * * *